US012806836B2

(12) United States Patent
Miyakoshi et al.

(10) Patent No.: US 12,806,836 B2
(45) Date of Patent: Nov. 24, 2026

(54) INJECTION MOLDING DEVICE

(71) Applicant: HONDA MOTOR CO., LTD., Tokyo (JP)

(72) Inventors: Yukio Miyakoshi, Tokyo (JP); Tetsuro Hosaka, Tokyo (JP); Koshi Sato, Tokyo (JP); Takahiro Oi, Tokyo (JP); Yo Kobayashi, Tokyo (JP); Hiroshi Otaguro, Tokyo (JP); Kazuhisa Fujiwara, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 48 days.

(21) Appl. No.: 18/785,134

(22) Filed: Jul. 26, 2024

(65) Prior Publication Data

US 2025/0033261 A1 Jan. 30, 2025

(30) Foreign Application Priority Data

Jul. 28, 2023 (CN) ......................... 202310938465.0

(51) Int. Cl.
*B29C 45/43* (2006.01)
*B29C 45/26* (2006.01)
(Continued)

(52) U.S. Cl.
CPC ............ *B29C 45/43* (2013.01); *B29C 45/261* (2013.01); *B29C 45/33* (2013.01); *B29C 45/4421* (2013.01)

(58) Field of Classification Search
CPC . B29C 53/824; B29C 59/021; B29C 45/2614; B29C 33/485; B29C 39/34; B29C 2043/425
See application file for complete search history.

(56) References Cited

U.S. PATENT DOCUMENTS 2,891,283 A * 6/1959 Chabotte ................. B29C 45/33 425/436 RM
3,986,698 A * 10/1976 Darnall, Jr. .............. B41D 7/00 425/589

(Continued)

FOREIGN PATENT DOCUMENTS

CH 643479 A5 * 6/1984 ......... B29C 45/4421
DE 202008013641 U1 * 3/2010 .............. F16L 43/00

(Continued)

*Primary Examiner* — Emmanuel S Luk
(74) *Attorney, Agent, or Firm* — CKC & Partners Co., LLC

(57) ABSTRACT

To provide an injection molding device capable of injection-molding a molded article in a tubular shape with a constant inner diameter by using a core with a simple structure with no draft angle. An injection molding device that injection-molds a molded article in a tubular shape with a constant inner diameter includes: a first mold and a second mold that form a cavity in a clamped state; a first core and a second core that are formed by splitting a core in a columnar shape disposed inside the cavity and have split surfaces inclined with respect to an axial center direction of the core and split from one end to the other end of the cavity in the axial center direction; and a slider that causes the first core or the second core to move in a sliding manner and be inserted into and pulled out of the cavity, in which the slider causes the first core or the second core to slide in a direction in which an angle formed with the axial center direction is within a range of greater than 0 degrees and less than an inclination angle of the split surface in a sectional view including the axial center and perpendicularly intersecting the split surface.

3 Claims, 6 Drawing Sheets

(51) Int. Cl.
*B29C 45/33* (2006.01)
*B29C 45/44* (2006.01)

(56) References Cited

U.S. PATENT DOCUMENTS

| | | | | | |
|---|---|---|---|---|---|
| 4,286,766 | A * | 9/1981 | von Holdt | B29C 45/4421 249/58 |
| 4,383,819 | A * | 5/1983 | Letica | B29C 45/33 249/58 |
| 4,438,065 | A * | 3/1984 | Brown | B29C 45/43 264/335 |
| 4,541,605 | A * | 9/1985 | Kubota | B29C 45/4421 249/59 |
| 4,676,732 | A * | 6/1987 | Letica | B29C 45/33 425/417 |
| 4,743,420 | A * | 5/1988 | Dutt | B29C 45/0046 264/102 |
| 5,368,468 | A * | 11/1994 | Boskovic | B29C 45/43 425/DIG. 102 |
| 5,631,030 | A * | 5/1997 | Brun, Jr. | B29C 45/73 425/526 |
| 6,210,624 | B1 * | 4/2001 | Mayer | A61M 39/26 264/318 |
| 7,153,125 | B2 * | 12/2006 | Evans | F16L 43/008 425/441 |
| 2007/0190275 | A1 * | 8/2007 | Helmenstein | B29C 45/0055 264/320 |
| 2010/0323051 | A1 * | 12/2010 | Helenius | F16B 21/04 425/161 |
| 2019/0001533 | A1 * | 1/2019 | Murphy | B29C 33/485 |

FOREIGN PATENT DOCUMENTS

| | | | | |
|---|---|---|---|---|
| GB | 2570537 | A * | 7/2019 | B29C 33/485 |
| JP | H0788903 | A * | 4/1995 | B29C 45/4421 |
| JP | 2002346723 | A | 12/2002 | |
| JP | 2007069588 | A * | 3/2007 | |
| WO | WO-2008119628 | A1 * | 10/2008 | F16L 43/008 |
| WO | WO-2019154794 | A1 * | 8/2019 | B29C 45/7312 |

* cited by examiner

INJECTION MOLDING DEVICE

This application is based on and claims the benefit of priority from Chinese Patent Application No. CN202310938465.0, filed on 28 Jul. 2023, the content of which is incorporated herein by reference.

BACKGROUND OF THE INVENTION

Field of the Invention

The present invention relates to an injection molding device.

Related Art

In an injection molding method, a molded article in a shape conforming to the shape of a cavity is molded by filling the cavity formed by clamping a mold with a material with fluidity such as a molten resin injected from an injector and cooling and solidifying the material with fluidity.

In a case in which a tubular member with a constant inner diameter is molded, a hollow portion of the tubular member is molded using a core in addition to the mold. Specifically, the core in a columnar shape that is the same shape as that of the hollow portion is placed inside the mold, and a cavity formed between the mold and the core is filled with the material with fluidity, and the material with fluidity is cooled and solidified. Thereafter, the core is pulled out of the molded article, and the hollow portion is thereby molded.

In the related art, the core requires a draft angle. This is for facilitating the pulling-out of the core from the molded article by providing a tapered surface in an axial center direction of the core in the columnar shape and pulling out the core from a large diameter portion side with a large area in a cross section perpendicular to the axial center direction. Also, this is because it is difficult to achieve mold release of a core in a straight shape with a constant outer diameter that comes into contact with the material because the material such as a resin causes contraction in volume during cooling and closely adheres to the mold and the core.

The hollow portion of the tubular member with the same diameter which is molded using the core provided with the draft angle includes the tapered surface. Therefore, an additional process such as boring machining is needed in a case of a product including a through-hole in a straight shape such as a pipe, for example.

Thus, a die casting machine has been proposed which includes a first core pin horizontally symmetrically tapered and provided with projecting portions in the middle of the tapered parts and second core pins placed on both sides of the first core pin, including, in inner circumferential portions, tapered parts with the same inclination as that of the aforementioned tapered parts, and including recessed portions engaged with the projecting portions of the first core pin and limiting the amount of relative movement of the two pins (see Japanese Unexamined Patent Application, Publication No. 2002-346723). According to the technology, it is possible to easily pull out the core pins without providing the draft angle, and an additional process such as boring machining is not needed.

Patent Document 1: Japanese Unexamined Patent Application, Publication No. 2002-346723

SUMMARY OF THE INVENTION

However, according to the technology of Japanese Unexamined Patent Application, Publication No. 2002-346723, it is necessary to include core pins having complicated members which are split into three parts.

An object of the present invention is to provide an injection molding device capable of injection-molding a molded article in a tubular shape with a constant inner diameter by using a core with a simple structure with no draft angle.

(1) An injection molding device (an injection molding device 1, which will be described later, for example) according to the present invention is a device that injection-molds a molded article (a molded article P, which will be described later, for example) in a tubular shape with a constant inner diameter, and includes: a first mold (a first mold 21, which will be described later, for example) and a second mold (a second mold 22, which will be described later, for example) that form a cavity (a cavity C, which will be described later, for example) in a clamped state;

a first core (a first core 41, which will be described later, for example) and a second core (second cores 42, 42B, which will be described later, for example) that are formed by splitting a core (a split core 4, which will be described later, for example) in a columnar shape disposed inside the cavity and have split surfaces (split surfaces 411, 421, 421B, which will be described later, for example) inclined with respect to an axial center direction (an axial center O1, which will be described later, for example) of the core and split from one end to the other end of the cavity in the axial center direction; and a slider (a slider 3, which will be described later, for example) that causes the first core or the second core to move in a sliding manner and be inserted into and pulled out of the cavity, in which the slider causes the first core or the second core to slide in a direction in which an angle formed with the axial center direction is within a range of greater than 0 degrees and less than an inclination angle (an angle r1-1 or an angle r1-2, which will be described later, for example) of the split surfaces in a sectional view including the axial center and perpendicularly intersecting the split surfaces.

In the present device, the first core and the second core that split the core in a columnar shape to be disposed in a cavity and have the split surfaces inclined with respect to the axial center direction of the core and split from one end to the other end of the cavity in the axial center direction are used. It is thus possible to split the core and cause the split cores to move in a sliding manner. Also, the present device includes the slider that causes the first core or the second core to move in a sliding manner in the direction in which the angle formed with the axial center direction is within the range of greater than 0 degrees and less than the inclination angle of the split surfaces in the sectional view including the axial center and perpendicularly intersecting the split surfaces. In this manner, a clearance is generated between a molded article and the core similarly to the core provided with a draft angle by causing the core to slide in the direction within the aforementioned range, and it is possible to smoothly pull out the core from the molded article.

(2) The injection molding device according to (1) above, further including: an air supplier (an air supplier 6, which will be described later, for example) that supplies air to the split surfaces.

According to the present device, it is possible to more quickly cause the split surfaces to be separated from each other, to cause the core to smoothly slide, and to pull out the core from the molded article, by supplying air from the air supplier to the split surfaces of the two split cores formed by splitting the core.

(3) The injection molding device according to (2) above, in which at least either the first core or the second core includes a groove (grooves 51, 52, which will be described later, for example) in the axial center direction of the split surface, and the air supplier supplies air to the groove.

According to the present device, by providing the groove in the split surface of at least either one of the two cores, it is possible to uniformly supply air from one end to the other end of the core through the groove, to thereby more effectively cause the split surfaces to be separated from each other, to cause the core to more smoothly slide, and to pull out of the core from the molded article.

According to the present invention, it is possible to injection-mold a molded article in a tubular shape with a constant inner diameter by using a core with a simple structure with no draft angle.

DETAILED DESCRIPTION OF THE INVENTION

First Embodiment

Hereinafter, an injection molding device according to a first embodiment of the present invention will be described in detail with reference to the drawings. Note that since an axial center of a split core 4, an axial center of a cavity C, and an axial center of a molded article P in the injection molding device according to the present embodiment are the same, the axial centers will be described as an axial center O1 below.

Figure 1:
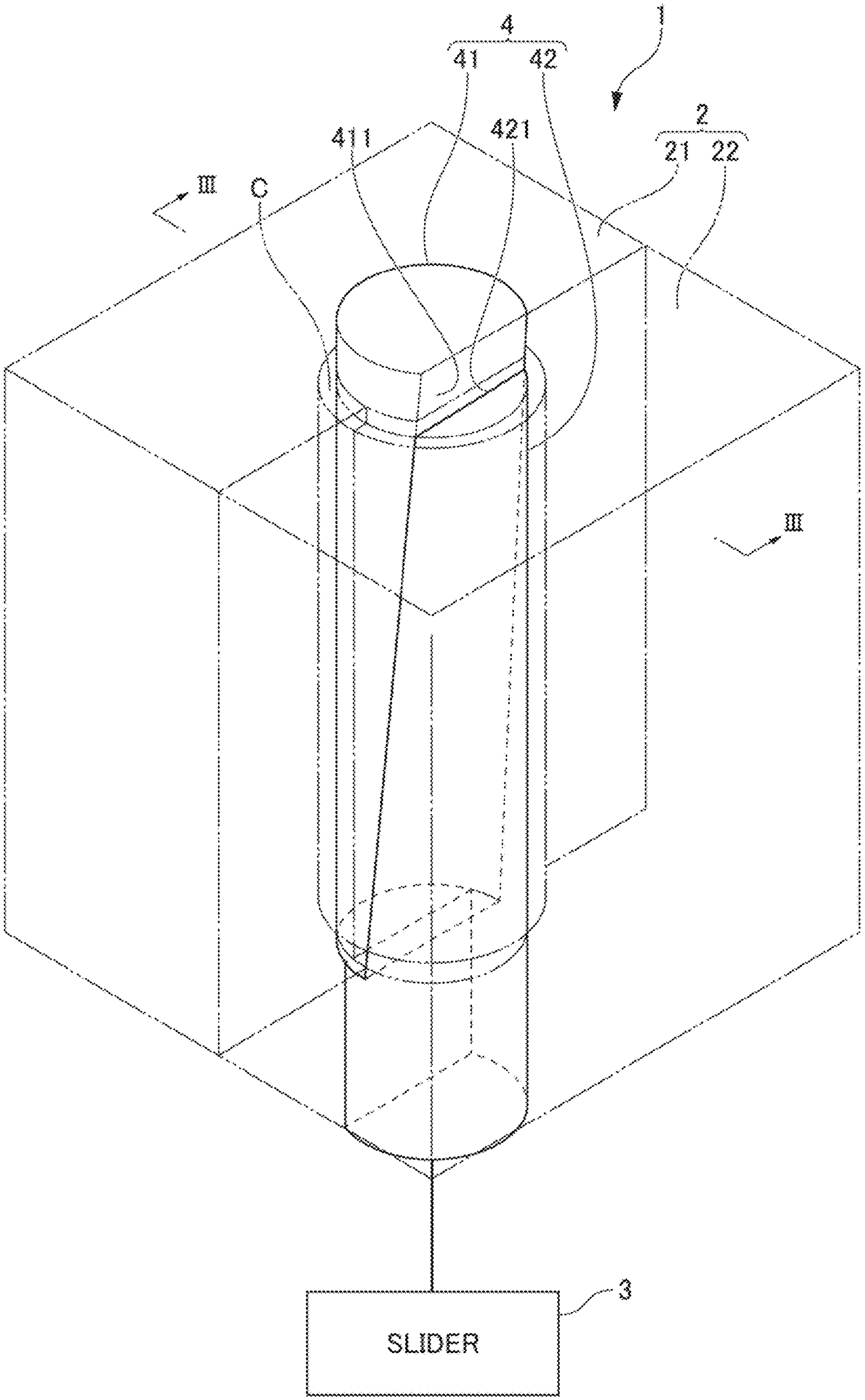
FIG. 1 is a perspective view illustrating an exterior configuration of an injection molding device according to a first embodiment.

FIG. 1 is a perspective view illustrating an exterior configuration of an injection molding device 1 according to the first embodiment. Note that in FIG. 1, a mold 2 is illustrated by virtual lines of two-dotted dashed lines. The outer shape of the mold 2 is not limited to the cubic shape, a configuration split into two parts is shown, and the inner shape of the clamped mold 2 corresponds to the shape of the cavity C.

The injection molding device 1 includes the mold 2, the cavity C, the split core 4, and a slider 3.

The mold 2 is configured of a first mold 21 and a second mold 22 that are of a fixed type and of a movable type capable of moving forward and backward in contrast to the fixed type. In the present embodiment, either of the molds may be of the fixed type or the movable type. The cavity C as a hollowed-out part to be filled with a molding material injected from an injector, which is not illustrated, is formed between the clamped first mold 21 and second mold 22. The molding material poured from a resin inlet port which is provided in the mold 2 and is not illustrated passes through a sprue, a runner, and a gate which are provided in the mold 2 and are not illustrated and then fills the cavity C. The molded article P is molded by the molding material filling the cavity C being cooled and solidified.

Figure 2:
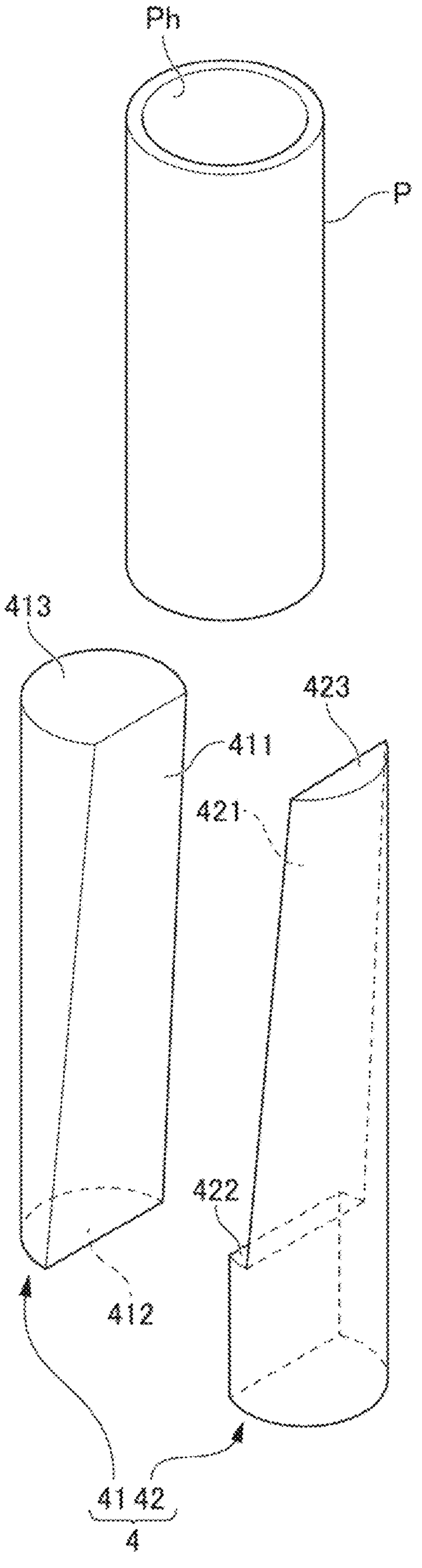
FIG. 2 is an exploded perspective view of a molded article molded by the injection molding device and a split core according to the first embodiment.

FIG. 2 is an exploded perspective view of the molded article P molded by the injection molding device 1 and the split core 4.

As illustrated in FIG. 2, the molded article P in the present embodiment is a cylindrical member. The molded article P in a tubular shape with a constant inner diameter includes a through-hole Ph, and the thickness of the molded article P is uniform. The cavity C has a columnar shape which is the same shape as the outer shape of the molded article P.

Returning to FIG. 1, the split core 4 is formed by splitting a core in a columnar shape. As illustrated in FIG. 1, the split core 4 is disposed in the cavity C with a first core 41 and a second core 42 combined in an abutting manner. The center of the split core 4 in the combined state has a columnar shape that is the same shape as that of the through-hole Ph of the molded article P and has a constant outer diameter.

As illustrated in FIG. 2, the first core 41 includes a split surface 411 inclined with respect to the axial center direction of the molded article P, a bottom surface portion 412, and an upper surface portion 413. The second core 42 includes a split surface 421 inclined with respect to the axial center direction of the molded article P, a horizontal portion 422 that is continuous with the split surface 421, and an upper surface portion 423. The split surface 421 of the second core 42 is a surface with the same shape as that of the split surface 411 of the first core 41 and is an inclined surface capable of abutting the split surface 411 with no clearance.

The slider 3 has a function of causing the first core 41 or the second core 42 to slide in a direction in which an angle formed with an axial center O1 direction is within a range of greater than 0 degrees and less than an inclination angle of the split surfaces in a sectional view including the axial center O1 and perpendicularly intersecting the split surfaces. The slider 3 is connected to a lower end portion of the second core 42 and causes the second core 42 to move in a sliding manner. Although an air cylinder or a hydraulic cylinder is assumed in a specific example, the slider 3 is not limited thereto, and any mechanism can be applied as long as it has a function of causing the core to slide.

Next, a specific method of injection-molding the molded article P in the tubular shape with the constant inner diameter using the split core 4 with a simple structure with no draft angle by the injection molding device 1 configured as described above will be described.

Figure 3:
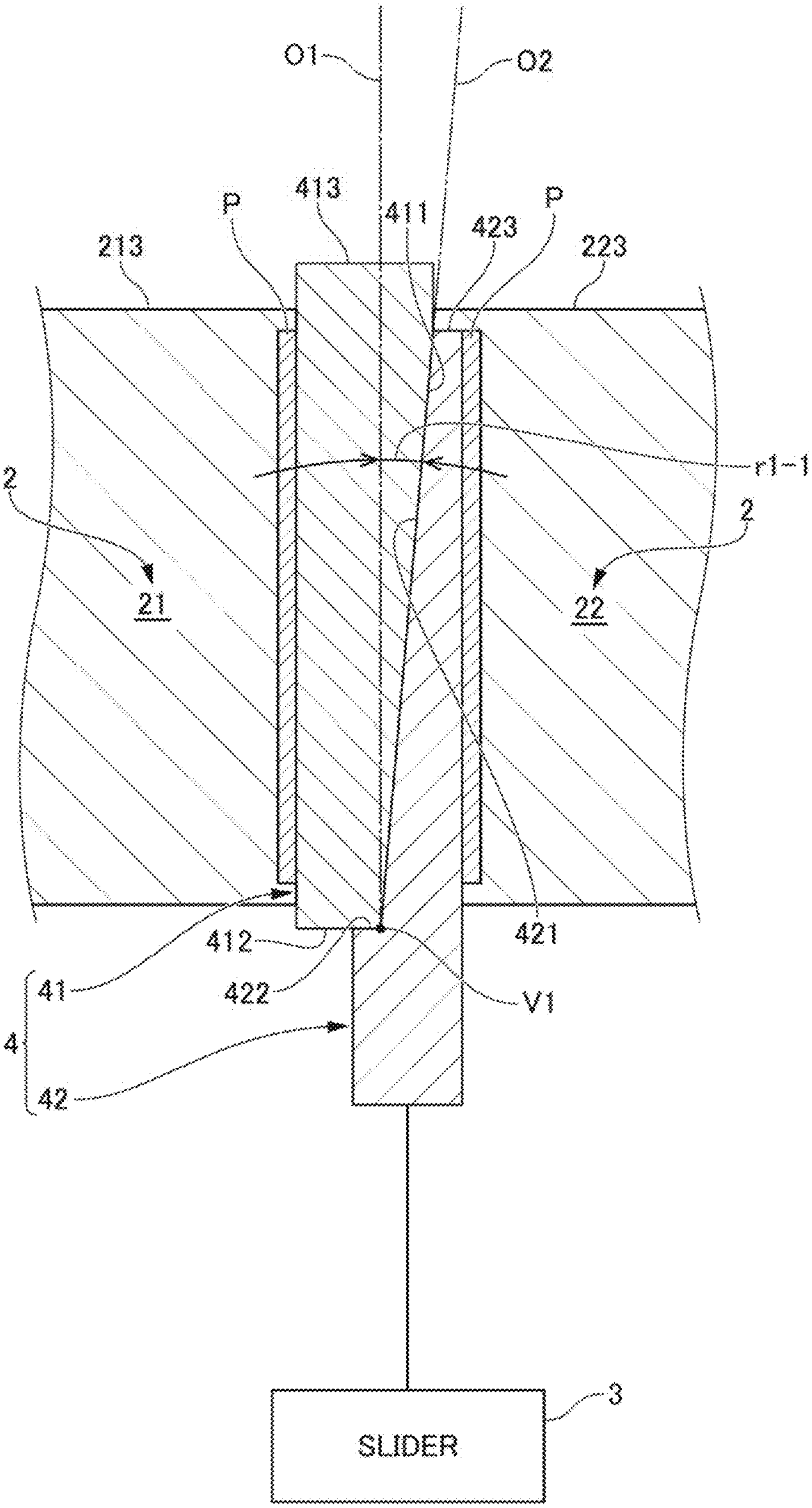
FIG. 3 is a sectional view along the III-III line in FIG. 1 illustrating a state in which a material has been solidified.

FIG. 3 is a sectional view along the line III-III in FIG. 1 and is a section including the axial center O1 and perpendicularly intersecting the split surfaces. A state in which a molding material poured from the resin inlet port that is provided in the mold 2 and is not illustrated has been solidified inside the cavity C is illustrated.

As illustrated in FIG. 3, the split surface 411 of the first core 41 and the split surface 421 of the second core 42 are caused to abut each other with no clearance, and the bottom surface portion 412 of the first core 41 is caused to abut the horizontal portion 422 of the second core 42 so as to cover the horizontal portion 422. The split core 4 is disposed such that the split core 4 is long in the vertical direction with respect to the mold 2 and an upper end and a lower end of the split core 4 project from the mold 2. Both end portions of the molded article P are covered with the mold 2 with no clearances.

The first core 41 has an angle r1-1 with an intersection V1 between the axial center O1 and a line O2 extended from a slope of the split surface 411 included as a vertex. The angle r1-1 is an inclination angle of the split surface 411.

Figure 4:
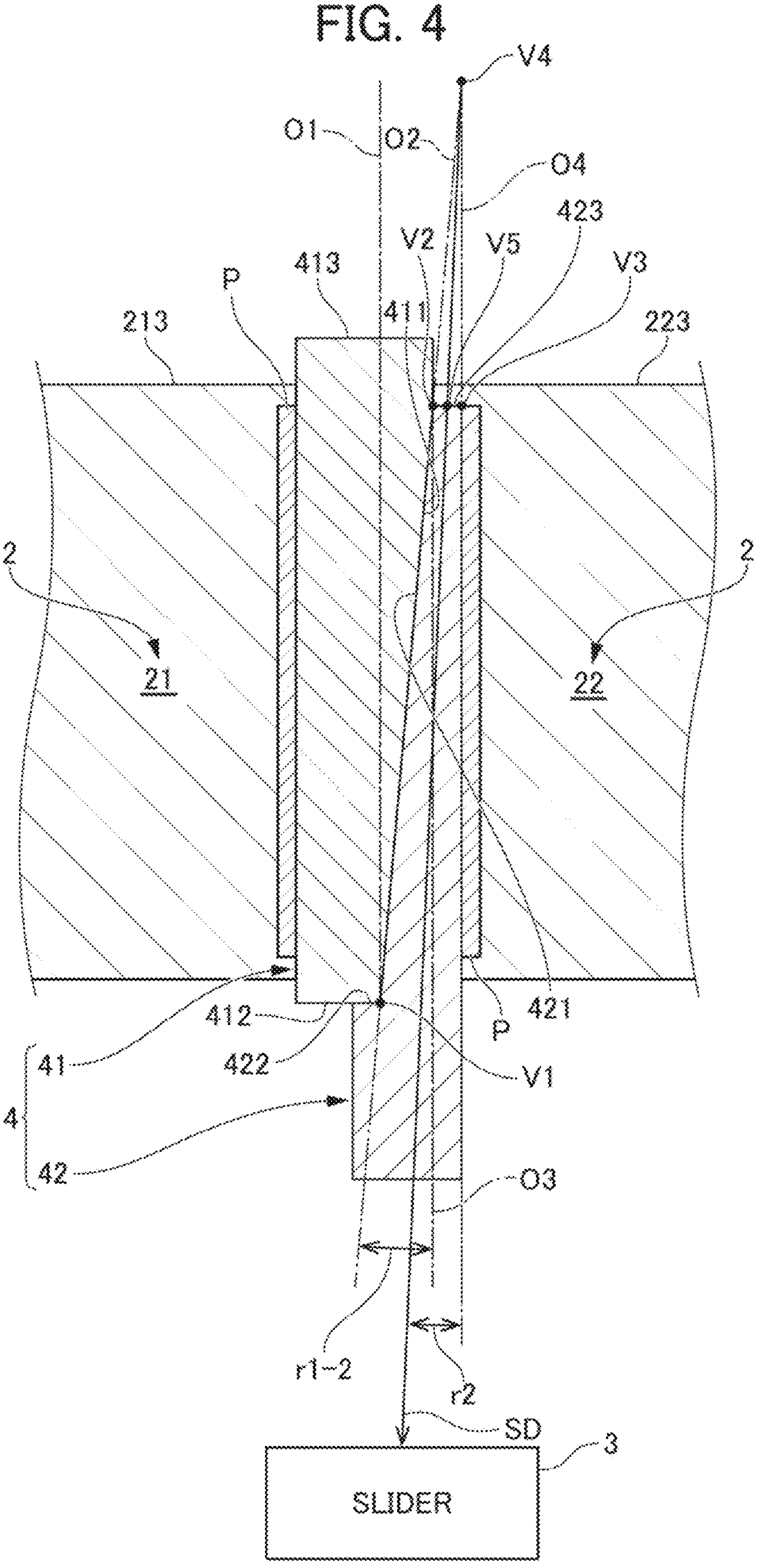
FIG. 4 is a sectional view illustrating a sliding direction of a slider in FIG. 3.

FIG. 4 is a sectional view illustrating a direction SD in which the slider 3 causes the second core 42 to slide.

As illustrated in FIG. 4, a point of the upper end portion of the split surface 411 is defined as a vertex V2, and the extension line O2 and a vertical line O3 extended vertically downward from V2 have an angle r1-2. The angle r1-1 and the angle r1-2 are equal angles and are the inclination angle of the split surface 411.

The slider 3 has a function of causing the split core 42 to slide in a direction in which the angle formed with the axial center O1 direction is within a range of greater than 0 degrees and less than the aforementioned inclination angles r1-1 and r1-2 of the split surface 411. With respect to the vertex V2 of the second core 42, the middle point of the upper surface portion 423 is defined as V5, and a point of the end portion on the opposite side is defined as a vertex V3. An intersection V4 is an intersection between a vertical line O4 extended upward from the vertex V3 and the extension line O2. An angle formed by the vertical line O4 and the extension line O2 with the intersection V4 included as a vertex is an angle equal to the angle r1-1 and the angle r1-2 and is the inclination angle of the split surface 411 and the split surface 421. The arrow SD starts from the intersection V4, passes through the middle point V5, and extends in the direction of the slider 3. An angle r2 formed by the extension line O4 extending from the intersection V4 and the arrow SD is within a range of greater than 0 degrees and less than the inclination angle r1-2.

Figure 5:
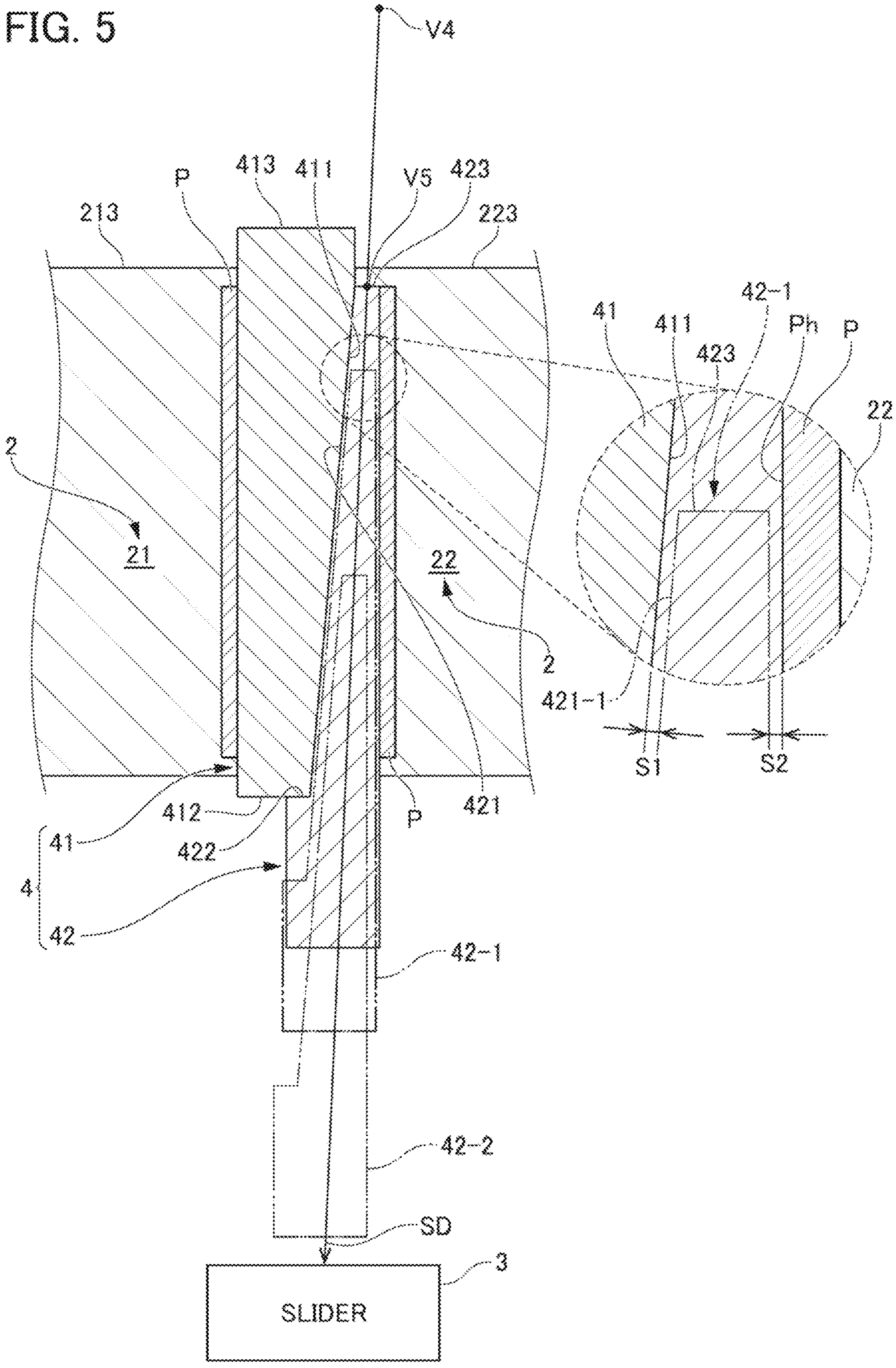
FIG. 5 is a sectional view illustrating a state in which the split core has been slid.

FIG. 5 is a diagram illustrating a state in which the slider 3 has caused the second core 42 to slide in the direction of the arrow SD. Note that the range surrounded by the broken lines is illustrated in an enlarged manner on the right side in FIG. 5.

A second core 42-1 and a second core 42-2 represented by the two-dotted dashed lines illustrate transition of motion of the second core 42 that has been moved by the slider 3. The second core 42 moves to the position of the second core 42-1 by the slider 3 causing the second core 42 to slide in the aforementioned direction of the arrow SD within the range of greater than 0 degrees and less than the inclination angle r1-2. Through the movement, a clearance S1 is generated between the split surface 411 of the first core 41 and the split surface 421-1 of the second core 42-1, and a clearance S2 is generated between an outer circumferential surface in an arc shape of the second core 42-1 in a plan view and the through-hole Ph of the molded article P. It is possible to cause the second core 42 to smoothly slide to the position of the second core 42-2 similarly to a core provided with a draft angle by the clearances S1 and S2 being generated in this manner. It is possible to pull out the second core 42 from the molded article P by the slider 3 causing the second core 42 to further slide in the same direction.

In regard to the sliding direction of the slider 3, the aforementioned clearance S2 is not generated in a case in which the second core 42 is caused to slide perpendicularly in a direction of 0 degrees, for example, and it is thus difficult to pull out the second core 42. Also, the aforementioned clearance S1 is not generated in a case in which the second core 42 is caused to slide in a direction at an angle that is equal to the inclination angle of the split surface 411 of the first core 41, and it is thus similarly difficult to pull out the second core 42. Therefore, the angle formed with the axial center O1 direction has to be within the range of greater than 0 degrees and less than the inclination angle of the split surface 411 of the first core 41, as the range of the sliding direction for causing the clearances S1 and S2.

According to the injection molding device 1 in the present embodiment, the following effects are achieved.

The injection molding device 1 according to the present embodiment includes: the first core 41 and the second core 42 that are formed by splitting the split core 4 in the columnar shape disposed inside the cavity C and including the split surface 411 and the split surface 421 inclined with respect to the axial center direction of the split core 4 and split from one end to the other end of the cavity C in the axial center direction of the split core 4; and the slider 3 that causes the first core 41 or the second core 42 to move in a sliding manner and be inserted into and pulled out of the cavity C.

In this manner, it is possible to cause the split surface 411 and the split surface 421 of the first core 41 and the second core 42 formed by splitting the split core 4 with no draft angle to slide, to move the second core 42 in a sliding manner by the slider 3, and to achieve insertion and pulling-out of the second core 42 into and from the cavity C.

Also, the slider 3 according to the present embodiment causes the second core 42 to slide in the direction in which the angle formed with the axial center O1 direction of the split core 4 is within the range of greater than 0 degrees and less than the inclination angle r1-1 of the split surface 411 of the first core in the sectional view including the axial center O1 of the split core 4 and perpendicularly intersecting the split surface.

In this manner, it is possible to easily achieve insertion and pulling-out of the second core 42 into and from the cavity C by the slider 3, to open the first mold 21 and the second mold 22 after removing the split core 4 from the mold 2, and to take out the molded article P in the tubular shape with the constant inner diameter.

Note that although the sliding direction is provided in the direction at the angle r2 passing through the middle point of the upper surface portion 423 of the second core 42 in the present embodiment, the sliding direction of the slider 3 is not limited to the angle r2. Equivalent effects are achieved through movement in a sliding manner within the range in which the angle formed with the axial center O1 direction is greater than 0 degrees and less than the inclination angle of the split surface 411 of the first core 41 as described above.

Also, although the slider 3 is connected to the lower end portion of the split core 4 and is caused to slide downward relative to the mold 2 in the present embodiment, the disposition of the slider 3 is not limited to the location below the mold 2. The slider 3 may be connected to an upper end portion of the first core 41, and the first core 41 may be slid upward and released from the mold. According to the present invention, it is possible to cause either of the first core 41 and the second core 42 to slide by the slider 3.

Moreover, although the axial center O1 direction of the cavity C and the split core 4 is provided in the vertical direction of the mold 2 in the present embodiment, the device according to the present invention is not limited thereto. For example, the axial center O1 direction of the cavity may be provided in the horizontal direction of the mold 2, or the cavity C and the split core 4 can be provided at any angle of the mold 2.

Also, although the second core 42 is caused to move in a sliding manner by the slider 3 just in the clamped state in the present embodiment, the present invention is not limited thereto. A configuration in which the second core 42 is caused to move in a sliding manner by the slider 3 after opening the mold may be employed.

Moreover, although the molded article P in the present embodiment is a cylindrical member with a constant outer diameter, what can be molded by the present invention is a molded article in a tubular shape with a constant inner diameter, and the outer shape is not limited. In a specific example, it is also possible to mold a molded article provided with a tapered part or the like on a side surface of the member or a molded article in a bottomed tubular shape with a constant inner diameter of a hollow portion, a hole end portion of which on one side is closed, instead of the through-hole.

Second Embodiment

Next, a second embodiment of the present invention will be described in detail with reference to the drawings. The second embodiment is different from the first embodiment in that an air supply pipe 6A provided in a second mold 22B, an air supplier 6, and a groove 51 and a groove 52 provided in a second core 42B are included. Since the other configurations are the same as those of the injection molding device 1 according to the first embodiment, description will be omitted.

Figure 6:
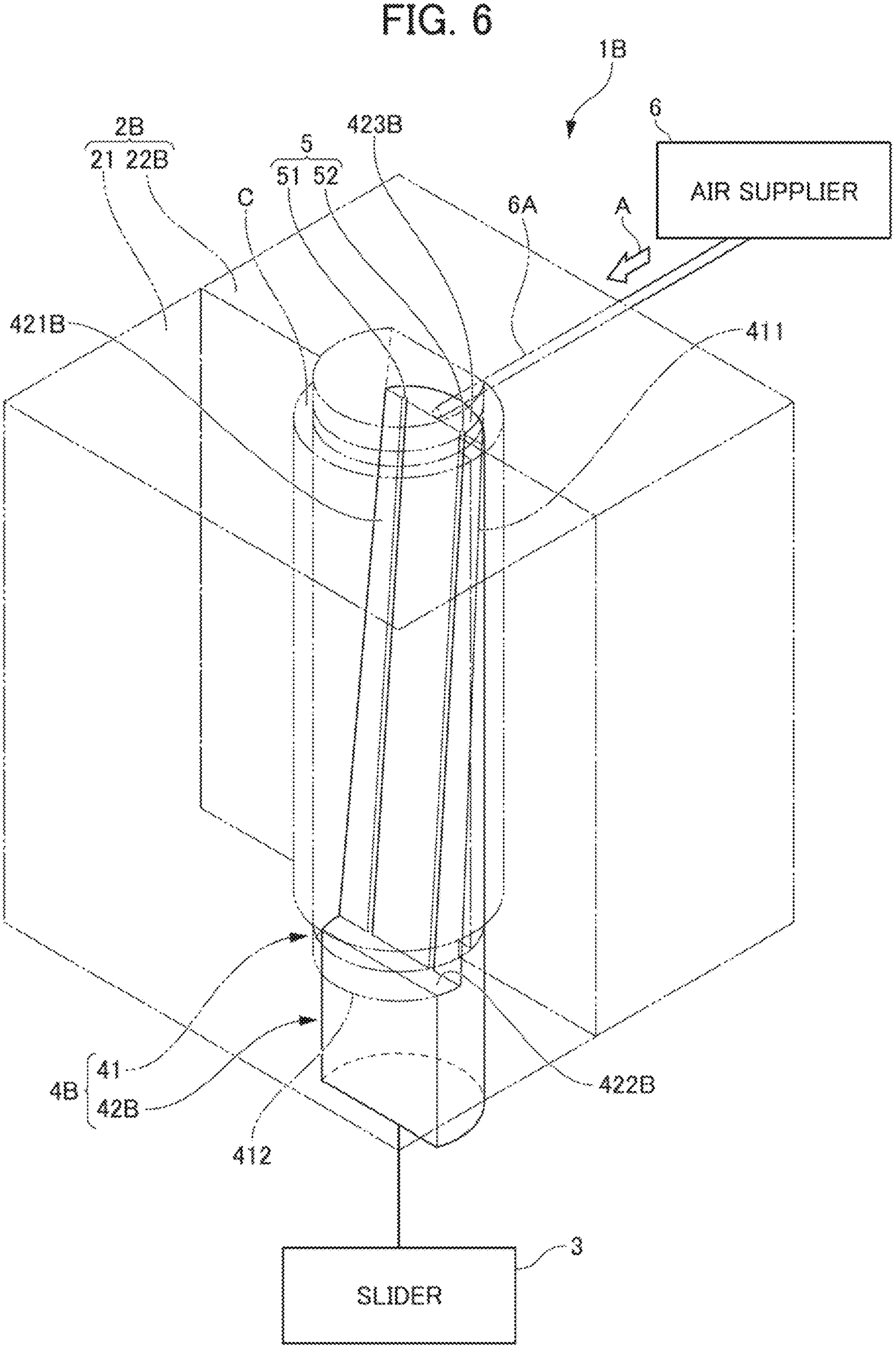
FIG. 6 is a perspective view illustrating an exterior configuration of an injection molding device according to a second embodiment.

FIG. 6 is a perspective view illustrating a state in which a split core 4B has been combined. Note that the first core 41 and the mold 2B are illustrated by the two-dotted dashed line in FIG. 6. The outer shape of the mold 2B is not limited to the cubic shape, a configuration split into two parts is shown, and the inner shape of the clamped mold 2B corresponds to the shape of the cavity C. The arrow A illustrated in the drawing is a direction of air supplied from the air supplier 6.

As illustrated in FIG. 6, the mold 2B is configured of a first mold 21 and a second mold 22B. The second mold 22B is provided with the air supply pipe 6A that extends in the horizontal direction, for example, and supplies air to the grooves 51 and 52 formed in a split surface 421B of the second core 42B. The air supplier 6 is connected to an end portion of the air supply pipe 6A formed to penetrate through the mold 22B.

The air supplier 6 has a function of supplying air in the direction of the arrow A. Specifically, an air supply source such as an air compressor is assumed, the air supplier 6 is not limited thereto, and any mechanism can be applied as long as it has the function of supplying air. Also, although an air cylinder may be used as the slider 3 as described above, it is possible to share the air supplier 6 and to efficiently operate the device in the case in which the air cylinder is used.

As described above, the split surface 421B of the second core 42B is provided with the groove 51 and the groove 52. The sectional shape of the groove 51 in the horizontal direction is a semicircular shape, and the groove is provided throughout the part from the upper end to the lower end in the axial center direction of the split surface 421B. The groove 52 that is parallel to the groove 51 is similarly provided throughout the part from the upper end to the lower end of the split surface 421B.

If the first core 41 and the second core 42B are combined, two hollow portions in a semicircular sectional shape in the horizontal direction are formed by the split surface 411 of the first core 41 and the groove 51 and the groove 52 of the second core 42B as illustrated in FIG. 6. An air groove 5 is configured of the two formed hollow portions. An upper end portion of the air groove 5 is opened from an upper surface portion 423B of the second core 42B, and a lower end portion is closed by the split surface 411 of the first core.

Next, a specific method of injection-molding a molded article P in a tubular shape with a constant inner diameter by an injection molding device 1B configured as described above will be described.

A cavity C is filled with a molding material poured from a resin inlet port that is provided in the mold 2 and is not illustrated, and the air supplier 6 is then operated in a state in which the molding material has been cooled and solidified inside the cavity C. Operations until the air supplier 6 is operated are similar to those in the first embodiment.

The air supplier 6 supplies air in the direction of the arrow A toward the split surface 411 of the first core 41. A flow of the air supplied in the direction of the arrow A flows to the inside of the air groove 5 with the closed end portion from the upper side to the lower side of the air groove 5 along the split surface 411 of the first core 41 and is retained. A wind pressure of the air retained inside the air groove 5 uniformly spreads to the surface where the split surface 411 of the first core 41 abuts the second core 42B, and a repulsing force between the split surfaces promotes an effect of causing the split surface 421B of the second core 42B to be separated from the split surface 411 of the first core 41.

According to the injection molding device 1B of the present embodiment, the following effects are achieved.

The injection molding device 1B according to the present embodiment further includes the air supplier 6 that supplies air to the split surface 411 of the first core 41 and the split surface 421B of the second core 42B and includes the groove 51 and the groove 52 in the axial center direction of the split surface 421B of the second core 42B, and the air supplier 6 supplies air to the groove 51 and the groove 52.

In this manner, the slider 3 can further smoothly pull out the second core 42B from the cavity C due to the effect of the air supplied from the air supplier 6. The groove 51 and the groove 52 enhance the effect of causing the air to uniformly reach the abutting split surface 411 and split surface 421B.

The air groove 5 is not limited to the aforementioned embodiment and may be provided either one of the first core and the second core, and a similar effect is also achieved even in a case in which air grooves 5 are provided in both of them. The shape of the groove 51 and the groove 52 is not limited to the semicircular shape, and various hollow portions such as triangular grooves with one side on the split surfaces of the core, for example, may be provided. Also, although two groove portions are included in the configuration of the present embodiment, the number of the groove portions can be increased or decreased according to the split cores.

Note that although the air supply pipe 6A is provided to be parallel to the horizontal surface of the mold 2B in the present embodiment, the present invention is not limited thereto. The air supplier 6 may be provided at any location depending on the shape of the mold, and the air supply pipe 6A may also be disposed in a bent or curved manner to conform with the air supplier 6. The shape is not limited to that in the present embodiment as long as the air supply pipe 6A has the function of supplying air to the split surface 411B of the first core 41.

Preferred embodiments of the present invention have been described hitherto. However, the present invention is not limited to the above embodiments and can be appropriately modified within the scope of the gist of the present invention. For example, although the grooves 51 and 52 are provided in the second embodiment, a configuration in which the grooves 51 and 52 are not provided and the air supply pipe 6A directly supplies air to the split surface 411 and the split surface 421B may also be employed.

EXPLANATION OF REFERENCE NUMERALS

- C Cavity
- P Molded article
- 1 Injection molding device
- 21 First mold
- 22 Second mold
- 3 Slider
- 41 First core
- 42, 42B Second core
- 411, 421, 421B Split surface
- 51, 52 Groove

What is claimed is:

1. An injection molding device that injection-molds a molded article in a straight tubular shape with a constant inner diameter, the injection molding device comprising:

a first mold and a second mold that form a cavity in a clamped state;

a first core and a second core that are formed by splitting a core in a columnar shape disposed inside the cavity and have split surfaces inclined with respect to an axial center direction of the core and split from one end to the other end of the cavity in the axial center direction; and a slider that causes the first core or the second core to move in a sliding manner and be inserted into and pulled out of the cavity, wherein the slider causes the first core or the second core to slide in a direction in which an angle formed with the axial center direction is within a range of greater than 0 degrees and less than an inclination angle of the split surfaces in a sectional view including the axial center and perpendicularly intersecting the split surfaces, thereby simultaneously generating a clearance between the split surfaces and a clearance between an outer circumferential surface of the sliding core and the molded article.

2. The injection molding device according to claim 1, further comprising:

an air supplier that supplies air to the split surfaces.

3. The injection molding device according to claim 2, wherein at least either the first core or the second core includes a groove in the axial center direction of the split surface, and the air supplier supplies air to the groove.

* * * * *